(12) United States Patent
Nakamura

(10) Patent No.: US 9,236,195 B2
(45) Date of Patent: Jan. 12, 2016

(54) DYE-SENSITIZED SOLAR CELL

(75) Inventor: Masaki Nakamura, Himeji (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/513,423

(22) PCT Filed: Nov. 24, 2010

(86) PCT No.: PCT/JP2010/070866
§ 371 (c)(1),
(2), (4) Date: Jun. 1, 2012

(87) PCT Pub. No.: WO2011/068058
PCT Pub. Date: Jun. 9, 2011

(65) Prior Publication Data
US 2012/0234385 A1    Sep. 20, 2012

(30) Foreign Application Priority Data
Dec. 2, 2009  (JP) .................................. 2009-274254

(51) Int. Cl.
*H01G 9/20*    (2006.01)
(52) U.S. Cl.
CPC ........... *H01G 9/2077* (2013.01); *H01G 9/2031* (2013.01); *H01G 9/2059* (2013.01); *H01G 9/2086* (2013.01); *Y02E 10/542* (2013.01)
(58) Field of Classification Search
CPC . H01G 9/2077; H01G 9/2031; H01G 9/2059; Y02E 10/542
USPC ................................................ 136/256, 259
See application file for complete search history.

(56) References Cited

U.S. PATENT DOCUMENTS

2008/0072957 A1*  3/2008  Chang et al. ................... 136/256
2008/0302418 A1* 12/2008  Buller et al. ................... 136/259

FOREIGN PATENT DOCUMENTS

JP   2001-135358 A   5/2001
JP   2004-119306 A   4/2004
(Continued)

OTHER PUBLICATIONS

The Engineering Toolbox, Coefficients of Linear Thermal Expansion, downloaded from the Internet Jun. 26, 2013, http://www.engineeringtoolbox.com/linear-expansion-coefficients-d_95.html.*

*Primary Examiner* — Shannon Gardner
(74) *Attorney, Agent, or Firm* — Roberts Mlotkowski Safran & Cole, PC; David S. Safran

(57) ABSTRACT

A dye-sensitized solar cell having a transparent conductive film at the inner surface of a tube-shaped transparent glass vessel, a semiconductor film photoelectrode to which a dye has been adsorbed formed on this transparent conductive film, and a counter electrode provided in the tube-shaped vessel spaced from this photoelectrode and an electrolytic solution enclosed in the tube-shaped vessel. Both ends of the tube-shaped vessel are tightly sealed by formation of sealing portions melting and compress the glass of the vessel; the transparent conductive film extends into the sealing portion at one end of the tube and an external lead is connected electrically to said transparent conductive film and is led out from the sealing portion to the outside of the tube-shaped vessel; and a lead connected electrically to the counter electrode is led out from the sealing portion at the other end to the outside of the tube-shaped vessel.

2 Claims, 5 Drawing Sheets

(56) References Cited

FOREIGN PATENT DOCUMENTS

| JP | 2007-012545 A | 1/2007 |
| JP | 2008-181691 A | 8/2008 |
| JP | 2009-252522 A | 10/2009 |
| JP | 2010-040391 A | 2/2010 |

* cited by examiner

DYE-SENSITIZED SOLAR CELL

BACKGROUND OF THE INVENTION

1. Field of the Invention

This invention relates to dye-sensitized solar cells. In particular, it relates to dye-sensitized solar cells having a light-permeable tube-shaped vessel.

2. Description of Related Art

Heretofore, development of solar cells as new energy sources with less influence on the global environment has been performed. Solar cells utilizing silicon semiconductors have a high conversion rate and an excellent light stability and therefore are generally widely used. However, from the viewpoint of manufacture, there are the problems that conditions of a high temperature and a high vacuum are necessary, so that it is difficult to implement large area cells, and the production costs are high.

Dye-sensitized solar cells wherein an electrolytic solution is filled into the interior of a transparent vessel, a photoelectrode of a porous semiconductor to which a dye has been adsorbed, and a counter electrode are provided, and electric energy can be output by utilizing the fact that the dye being irradiated with sunlight emits electrons are known (see, Japanese patent laid-open publication 2007-12545). This kind of solar cell has the advantage that no high vacuum chamber is necessary for the production, so that the burdens with regard to the facilities are reduced, and a low-price production becomes possible.

FIG. 5(a) is a cross-sectional view along the direction of the tube axis of the conventional dye-sensitized solar cell shown in the Japanese patent laid-open publication 2007-12545, and FIG. 5(b) is a cross-sectional view along line Z-Z' in FIG. 5(a).

As to this solar cell 8, a transparent conductive layer 82, a dye-sensitized porous semiconductor layer 83 to which a dye has been adsorbed, and an electrolyte layer 84 are provided successively on the inner surface of a tube 81 made from a transparent material, and a counter electrode 85 is inserted into the interior of the tube 81 along the longitudinal tube axis. One end part 85b of the counter electrode projects outward from the tube 81. The space between an end part 81b of the tube 81 and the end part 85b of the counter electrode 85 as well as the space between the other end part 81a of the tube 81 and the other end part 85b of the counter electrode 85 are insulated and sealed by means of a sealing member 86 made, for example, from epoxy resin, thus the electrolytic solution of the electrolyte layer 84 does not leak out to the outside of the tube 81. The lead wires 87, 88 are connected to the counter electrode 85 and the transparent conductive layer 82 respectively.

When this solar cell 8 is irradiated with sunlight, the sunlight passes through the tube 81 and the transparent conductive layer 82 and reaches the dye-sensitized porous semiconductor layer 83, a photochemical reaction occurs and electrons are emitted by the dye, by means of which an electromotive force is generated between the lead wires 87, 88.

Because, by means of this configuration, the vessel has a cylindrical shape, the change in the electric power generation with regard to the incident angle of the light can be significantly reduced.

Problems to be Solved by the Invention

Because of the necessity that the sealing of this kind of dye-sensitized solar cell is electrically insulating, it is implemented by means of a sealing material composed of a resin, as was mentioned above. But, as the sealing member is a member that is separate from the vessel and is made of a different material, it is difficult to ensure the air tightness of the seal. As sunlight is a light containing UV rays and the resin is exposed to these UV rays, it deteriorates during usage. Thus, there is the problem that the electrolytic solution filled into the interior leaks out. Therefore, there is the problem that the reliability of the seal is not sufficient in structures using a sealing material made from a resin.

SUMMARY OF THE INVENTION

The present invention has the object to provide a dye-sensitized solar cell having highly reliable sealing portions so that no leakage of the electrolytic solution occurs.

To solve the above-mentioned problems, the dye-sensitized solar cell of the present invention has a transparent conductive film at the inner surface of a tube-shaped vessel made of transparent glass, a photoelectrode made of a semiconductor film to which a dye has been adsorbed being formed on this transparent conductive film, a counter electrode provided in this tube-shaped vessel spaced from the photoelectrode and an electrolytic solution enclosed in the tube-shaped vessel wherein both ends of the tube-shaped vessel are tightly sealed by means of sealing portions for which the glass of the tube-shaped vessel has been melted and compressed; wherein the transparent conductive film extends into the sealing portion at one end and an external lead connected electrically to the transparent conductive film is led out from the sealing portion to the outside of the tube-shaped vessel; and a lead connected electrically to the counter electrode is led to the outside of the tube-shaped vessel from the sealing portion at the other end.

Then, the present invention is characterized in that the transparent conductive film and the external lead are connected electrically in the sealing portion at said one end side by means of a metal foil being embedded in the sealing portion at said one end side; and the internal lead being connected to the counter electrode and the external lead are connected electrically in the sealing portion at said other end side by means of a metal foil being embedded in the sealing portion at said other end side.

Then, the present invention is characterized in that said counter electrode is coupled to and held at the sealing portion at the one end side into which said transparent conductive film extends via an insulating member.

The present invention, wherein at the inner surface of a tube-shaped vessel made from transparent glass a transparent conductive film, a photoelectrode consisting of a semiconductor film to which a dye has been adsorbed being formed on this transparent conductive film, and a counter electrode provided in this tube-shaped vessel in a state in which it is spaced from this photoelectrode are provided and an electrolytic solution is filled into said tube-shaped vessel and a sealing portion is formed at both ends of the tube-shaped vessel is characterized in that the sealing portion at one end of the tube-shaped vessel is formed by melting and compressing the glass of said tube-shaped vessel, the transparent conductive film extends into the sealing portion at that end and an external lead connected electrically to the transparent conductive film being led out to the outside of the tube-shaped vessel from that sealing portion; the sealing portion at the other end of the tube-shaped vessel is formed by means of fusion bonding the glass of the other end of the tube-shaped vessel to a buffer glass layer that has been fusion bonded to a small diameter lead part of the counter electrode; and wherein the coefficient of thermal expansion of the buffer glass is higher than the coefficient of thermal expansion of the glass of the tube-shaped vessel and lower than the coefficient of thermal expansion of the counter electrode.

Because, according to the present invention, the sealing portions are formed by melting and compression bonding of the glass of the end parts of the tube-shaped vessel, there is no leakage of the electrolytic solution filled into the interior.

Because the sealing portions are formed from glass, there is no deterioration despite irradiation with UV rays contained in the sunlight, and a stable utilization for a long period becomes possible.

Then, because, according to the present invention, the electric connection between the inside and the outside of the tube-shaped vessel is provided via metal foils embedded in the sealing portions, stresses caused by the difference in the coefficients of thermal expansion of the glass and the metal in the process of cooling after the sealing are diminished. Therefore, cracks are hardly caused in the sealing portion and a leakage of the electrolytic solution can be prevented even more reliably.

Then, according to the present invention, the counter electrode is held by the sealing portions of both ends and is coupled physically via an insulator to the internal lead being connected to the transparent conductive film, the counter electrode and the photoelectrode are insulated electrically and the counter electrode is held.

Then, according to the present invention, thermal stresses caused by the difference of the expansion and the shrinkage can be diminished because of the configuration wherein a buffer glass is present as an intermediate layer between the small diameter lead part of the counter electrode and the glass of the tube-shaped vessel, there is no risk even in case of a rod-shaped counter electrode that breakages such as cracks are generated in the sealing portion during the cooling process after the sealing.

Because the sealing portions are formed from glass, there is no deterioration despite the irradiation with UV rays contained in the sunlight, and a stable utilization for a long period becomes possible.

BRIEF DESCRIPTION OF THE DRAWINGS

FIGS. 1(a) to 1(c) are views showing a dye-sensitized solar cell according to an embodiment of the present invention, wherein FIG. 1(a) is a cross-sectional view along the direction of the tube axis, FIG. 1(b) is a cross-sectional view of a state wherein only the sealing portion of FIG. 1(a) has been rotated 90°, and FIG. 1(c) is a cross-sectional view taken along line A-A' in FIG. 1(a) in the direction of the tube diameter.

FIGS. 4(a) and 4(b) are views showing a dye-sensitized solar cell according to another embodiment of the present invention, wherein FIG. 4(a) is a cross-sectional view along the direction of the tube axis, and FIG. 4(b) is a cross-sectional view taken along line B-B' in FIG. 4(a) along the direction of the tube diameter.

FIG. 5 is a view showing a dye-sensitized solar cell according to the state of the art wherein

DETAILED DESCRIPTION OF THE INVENTION

Figure 1A:
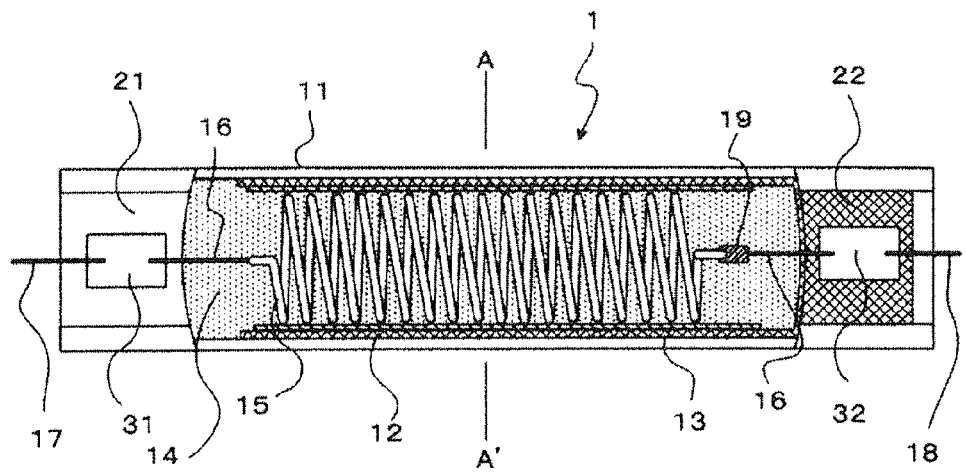
Figure 1B:
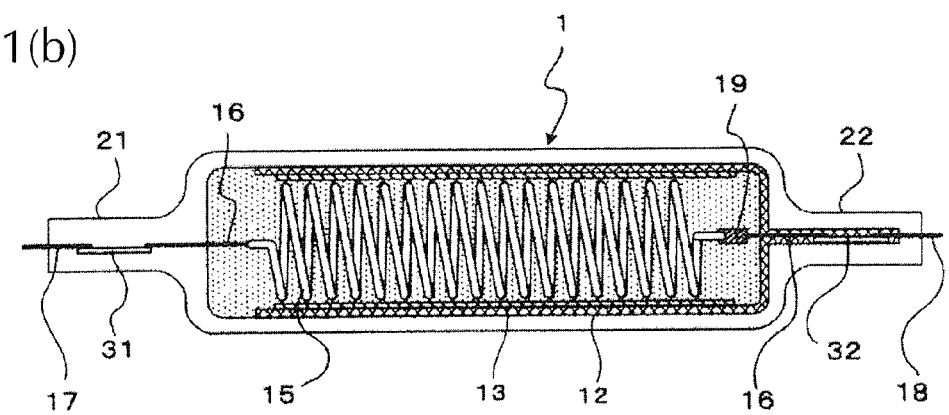
Figure 1C:
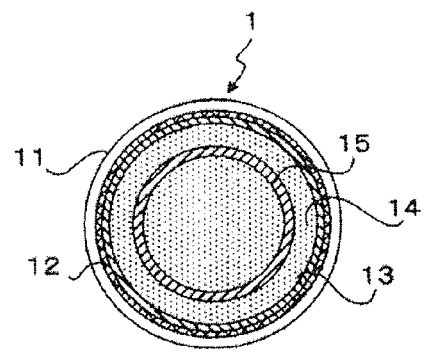

FIG. 1(a) shows a cross-sectional view of a dye-sensitized solar cell according to an embodiment of the present invention along the direction of the tube axis, FIG. 1(b) shows a cross-sectional view of a state wherein only the sealing portion of FIG. 1(a) has been rotated for 90°, and FIG. 1(c) shows a cross-sectional view of A-A' in FIG. 1(a) along the direction of the tube diameter.

At the inner surface of a tube-shaped vessel 11, a transparent conductive film 12 and a photoelectrode 13 being formed on this transparent conductive film 12 are provided sequentially. In the interior of the tube-shaped vessel 11, a coil shaped counter electrode 15 is arranged along the longitudinal direction. Both ends of the tube-shaped vessel 11 are sealed, and an electrolytic solution 14 is enclosed with the interior thereof.

Below, each structure will be explained concretely. In the following explanation, the right end part in the drawing will be referred to as 'the one end part' while the left end part in the drawing will be referred to as 'the other end part'.

The tube-shaped vessel 11 making up the solar cell 1 is made of a transparent material such as, for example, glass. The cross-sectional shape of the tube-shaped vessel 11 may be any shape such as circular, elliptical or rectangular.

As to the type of the glass making up the tube-shaped vessel 11, ideally quartz glass or soda glass or the like is utilized.

At the inner circumferential surface of the tube-shaped vessel 11, the transparent conductive film 12 is formed along the whole circumference. For the transparent conductive film 12, ideally, a film from an indium(In)-tin(Sn)-complex oxide (ITO (including those doped with fluorine)) or a metal oxide such as zinc oxide (ZnO) or tin oxide is utilized. Further, the transparent conductive film 12 may also be made up from two or more kinds of substances by combining the above-mentioned materials.

Instead of this, it is also possible to use a metal electrode for the transparent conductive film 12, wherein the metal is formed mesh-shaped or stripe-shaped or the like so that light can pass through a portion thereof.

The photoelectrode 13 for a photoelectric conversion of the sunlight is provided on this transparent conductive film 12. The photoelectrode 13 is a semiconductor layer to which a sensitizing dye has been adsorbed. It is provided in the area excluding both ends of the tube-shaped vessel 11 where the sealing portions are formed. The semiconductor layer is a porous thin film formed by depositing semiconductor particles being, for example, metal oxides or metal sulfides. As to the material, in case of a metal oxide, e.g., titanium oxide, tin oxide, zinc oxide, niobium oxide, tantalum oxide or zirconium oxide or the like can be used. Then, also a complex oxide, such as strontium titanate, calcium titanate or barium titanate, can be used.

In case of a metal sulfide, e.g. zinc sulfide, lead sulfide or bismuth sulfide or the like can be used.

The semiconductor layer can be prepared by coating a paste containing fine particles of the metal oxide or metal sulfide on the surface of the transparent conductive layer and firing it. To render the semiconductor layer porous, for example, the sol-gel method, the sputter method or the method of sintering fine particles can be used. As to the method for applying the paste, for example, the screen printing method, the doctor blade method or the squeegee method or the like can be used.

The sensitizing dye that is adsorbed to the semiconductor layer is a metal complex or an organic dye or the like having absorbability in the visible light region or, additionally, in the UV region.

As to metal complexes, for example, metal phthalocyanines, such as copper phthalocyanine or titanyl phthalocyanine, chlorophyll, hemin or derivatives thereof or a complex of ruthenium, osmium, iron or zinc, can be used.

As to organic dyes, ideally a metal-free phthalocyanine, a diamine type dye, a metallocyanine type dye, a xanthene type dye, a triphenyl methane type dye, a phthalocyanine type dye, a naphthalocyanine type dye, a phthalo/napthalo mixed phthalocyanine type dye, a dipyridyl ruthenium complex dye, a terpyridyl ruthenium complex dye, a phenanthroline ruthenium complex dye, a phenyl xanthene dye, a triphenyl methane dye, a coumarin dye, an acridine dye or an azo metal complex dye or the like can be used.

The sensitizing dye is adhered to the surface of said semiconductor layer. As to the way of adhering, any way of adhering such as chemical adsorption, physical adsorption or depositing or the like is possible. As to the adhering method, there is, for example, the method of heating after submerging the porous film forming the semiconductor layer in a solution containing the sensitizing dye.

For the electrolytic solution filled into the interior of the tube-shaped vessel 11, an electrolytic solution for which a redox electrolyte, such as an $I^-/I^{3-}$-type, a $Br^-/Br^{3-}$-type or a quinone/hydroquinone type, has been dissolved in an electrochemically inactive solvent, such as acetonitrile, propylene carbonate or ethylene carbonate or in a solvent mixture thereof, can be used. As the $I^-/I^{3-}$-type electrolytic solution, for example, an ammonium salt of iodine or a mixture of lithium iodide and iodine can be used.

For the counter electrode 15 opposing the photoelectrode 13, a conductive material, such as platinum or an object for which a platinum thin film has been provided on the surface of a conductive material, rhodium, ruthenium, ruthenium oxide, carbon or the like, can be used. Ideally, these conductive materials show catalytic activity so that the reduction reaction of the electrolytic solution can be performed with a sufficient speed.

As to the shape of the counter electrode 15, an electrode formed into a rod-shape or a coil-shape can be used.

The sealing portions of both ends of the tube-shaped vessel are configured as follows.

FIG. 2 is a cross-sectional view to explain the method for forming the sealing portions of the dye-sensitized solar cell according to the present invention.

As was explained above, the transparent conductive film 12 and the photoelectrode 13 on this transparent conductive film are formed sequentially on the inner circumferential surface of a glass tube 11A for forming the tube-shaped vessel.

At one portion of the other end part (the left end part in the direction of the tube axis in the drawing), there is an uncoated region 12A where no transparent conductive film 12, etc. has been formed for the subsequent formation of a sealing portion leading a small diameter lead part out of the tube while insulating the opposing counter electrode.

Figure 2A:
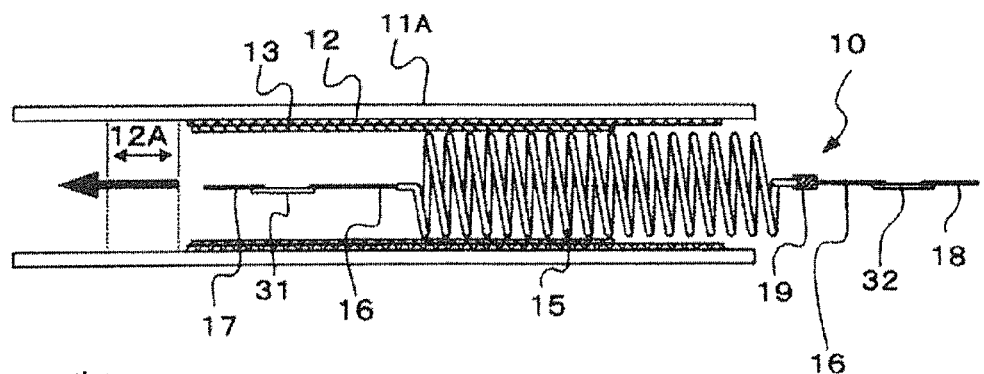
FIGS. 2(a) to FIG. 2(c) are cross-sectional views to explain the method for forming the sealing portions of the dye-sensitized solar cell of the embodiment of FIGS. 1(a) to 1(c) in the sequence of the processes.

An electrode mount 10 is inserted into the interior of this glass tube 11A (FIG. 2(a)). The electrode mount 10 is a connected body comprising internal leads 16, 16 made from a metal wire, metal foils 31, 32 and external leads 17, 18 made from a metal wire at both ends of the counter electrode 15, wherein one end (the left end) of the counter electrode 15 and the internal lead 16 are coupled via an insulator 19.

By pulling both ends thereof, the electrode mount 10 having been inserted into the interior of the glass tube 11A is held independently in the tube in a state in which it is spaced from the photoelectrode, such as is shown by the left and right arrows. In this state, both end parts of the tube-shaped vessel 11 are heated by a suitable heating means such as a burner or a locally heating heater or the like.

Figure 2B:
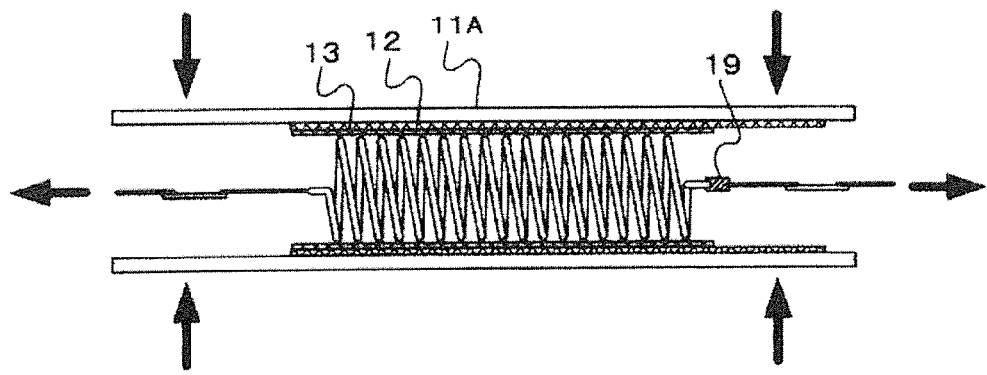

After both ends of the glass tube 11A have been heated suitably and a portion thereof has melted and softened, both of the ends are compressed vertically together, such as is shown by the arrows, by means of which sealing portions 21, 22 are formed (FIG. 2(b)).

Figure 2C:
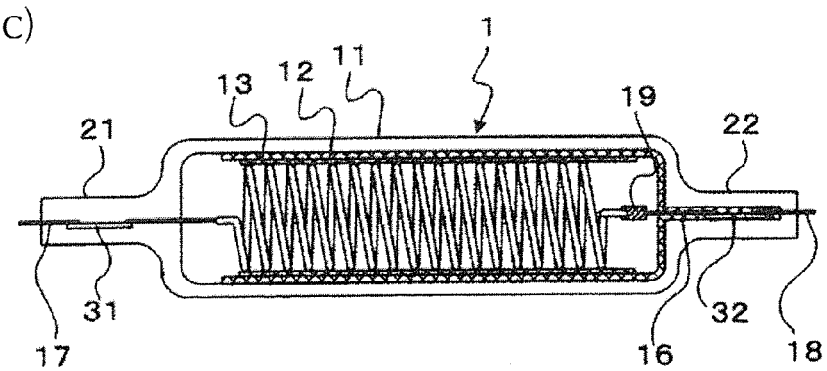

The sealing portions 21, 22 formed by this compression have a flat plate-shape, by means of which the tube-shaped vessel 11 shown in FIG. 2(c) is formed.

In FIG. 2(c), the other end part (the left end part) is in the sealing portion 21 where the lead formed at the other end of the counter electrode 15 is led out to the outside, while the one end part (the right end part) is in the sealing portion 22 where the lead of the photoelectrode 13 is led out to the outside.

Because these sealing portions 21, 22 are not made up by means of a sealing material which is different from the glass tube 11A and is used as a cap or a plug, but have a closed configuration for which the end parts of the glass tube 11A for the formation of the tube-shaped vessel are softened and processed and the glass of the open end parts is fused and solidified, gaps hardly occur in the sealing portions, the air tightness is high and the electrolytic solution does not leak out.

A metal foil 31 is buried in the sealing portion 21 of the other end side (the left end side), and the internal lead 16 extending from the interior of the tube-shaped vessel 11 and being connected to the other end (the left end) of the counter electrode 15 is bonded by means of welding or the like onto the surface of the inner end side (right end side) portion thereof.

Similar to the internal lead 16, the external lead 17 projecting to the outside of the tube-shaped vessel 11 is bonded by means of welding or the like to the outer end (left side) of the metal foil 31.

The electric connection between the inside and the outside of the tube-shaped vessel 11 is effected by the metal foil 31. Thus, it is prevented that thermal stresses arise and cracks are generated in the sealing portion 21 during the cooling process after the sealing because of the differences of the coefficients of thermal expansion of the glass and the metal. Thermal stresses are diminished because they are absorbed by means of a plastic deformation of the metal foil 31.

A sealing portion not having any problems with regard to air tightness can also be formed without using the metal foil 31 if the external lead 17 is, for example, a fine metal wire with a diameter of at most 0.3 mm.

The transparent conductive film 12 formed at the inner surface of the tube-shaped vessel 11 extends into the interior of the sealing portion 22 at the one end (the right end) from which the lead of the photoelectrode 13 is led out. Similarly, a metal foil 32 is embedded, and the internal lead 16 extending from the interior of the tube-shaped vessel 11 is bonded onto the surface of the inner end side (left end) thereof.

The outer lead 18 projecting to the outside of the tube-shaped vessel 11 is bonded in the same way to the outer end side (left end side) of the metal foil 32.

Because the transparent conductive film 12 is applied along the inner surface of the glass tube 11A for forming the tube-shaped vessel, the continuous state thereof from the body part of the tube-shaped vessel 11 to said sealing portion 22 is also maintained when the sealing portion 22 has been formed by compressing the end part of the glass tube 11A. Even if, supposedly, a part of the transparent conductive film should be delaminated or should be interrupted, a contact and an electric connection between this transparent conductive film 12 and the metal foil 32 buried in the sealing portion 22, the internal lead 16 and the external lead 18 would be established by means of the compression.

An insulator 19 being fixed and coupled physically to one end (the right end) of the counter electrode 15 is connected to the inner end part (the left end part) of the internal lead 16 connected to the inner end side (left end side) portion of the metal foil 32.

The outer end part of this internal lead 16 is bonded by means of welding or the like to the surface of the metal foil 32. As to the above description, the insulator 19 is, for example, a glass element while the internal lead 16 is a metal wire or the like. The fixing between the counter electrode 15 and the insulator 19 and between the insulator 19 and the internal lead 16 is performed suitably by a method such as fusing, winding or the like.

Thus, the counter electrode 15 in the tube-shaped vessel 11 is fixed by the sealing portions 21, 22 at both ends and is held in a state in which it is spaced from the photoelectrode 13. This counter electrode 15 is insulated with regard to the internal lead 16 contacting the transparent conductive film 12, because it is coupled therewith physically via the insulator 19.

Figure 3A:
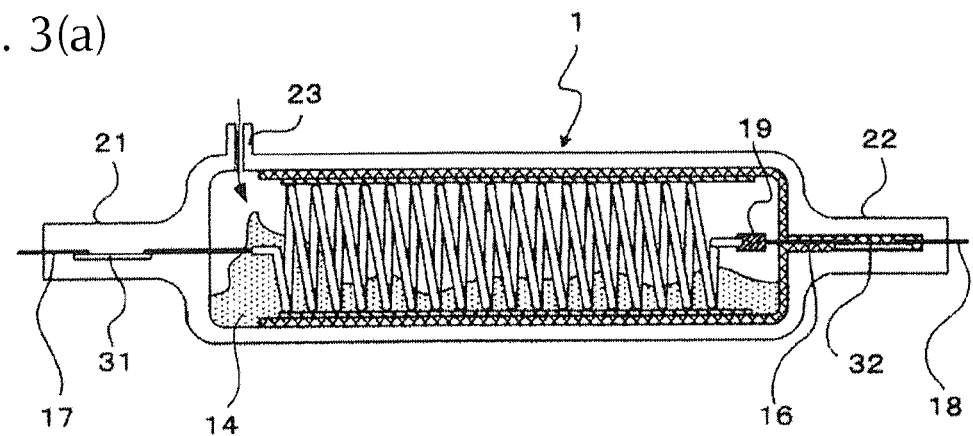
FIG. 3(a) and FIG. 3(b) are cross-sectional views to explain the method for filling the electrolytic solution into the tube-shaped vessel during the manufacture of the dye-sensitized solar cell of the embodiment of FIGS. 1(a) to 1(c) in the sequence of the processes.
Figure 3B:
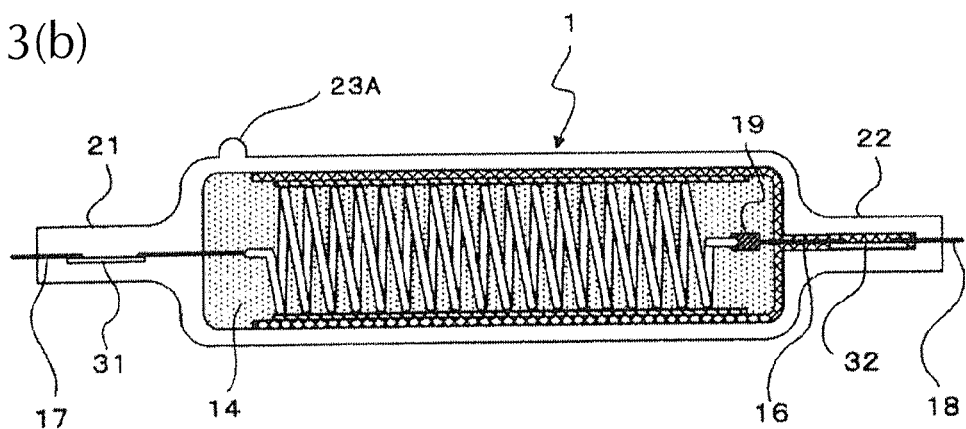

The filling of the electrolytic solution 14 into the tube-shaped vessel 11 is performed via an injection tube. This will be explained using FIG. 3.

FIG. 3 is a cross-sectional view to explain the method for filling the electrolytic solution into the tube-shaped vessel of the dye-sensitized solar cell.

After the formation of both sealing portions 21, 22, an injection tube 23 is provided in the uncoated region 12A. After the electrolytic solution 14 has been injected into the tube-shaped vessel 11 from this injection tube 23 (FIG. 3(a)) and the interior of the tube-shaped vessel 11 has been filled up, the end part of this injection tube 23 is sealed by heating (FIG. 3(b)). The reference numeral 23A denotes the sealed tip of the injection tube 23.

Returning to FIG. 1, the operation of this dye-sensitized solar cell will be explained. The light radiating into the tube-shaped vessel 11 from the outside passes into the tube-shaped vessel 11 through the transparent conductive film 12 and irradiates the photoelectrode 13. The dye adsorbed to the semiconductor layer of the photoelectrode 13 is excited and generates electrons. These electrons are transferred from the dye to the semiconductor layer. The dye having lost electrons receives electrons from the ions of the electrolytic solution 14 and the electrolyte molecules having delivered these electrons receive electrons from the counter electrode 15. Thus, an electromotive force is generated between the external leads 17, 18.

Because of the above-mentioned configuration of the sealing portions of the solar cell, the end parts of the tube-shaped vessel are sealed air tight by melting and solidifying of the glass, the electrolytic solution filled into the interior does not leak out.

Then, because the sealing portions are formed from glass, there is no deterioration despite the irradiation with UV rays contained in the sunlight and a stable utilization for a long period becomes possible.

Then, because the electric connection between the inside and the outside of the tube-shaped vessel is provided via the metal foils embedded in the sealing portions, stresses caused by the difference in the coefficients of thermal expansion of the glass and the metal in the process of cooling after the sealing can be diminished. Therefore, the generation of cracks in the sealing portions can be prevented and there is no leakage of the electrolytic solution.

Next, a dye-sensitized solar cell according to another embodiment of the present invention will be explained.

Figure 4A:
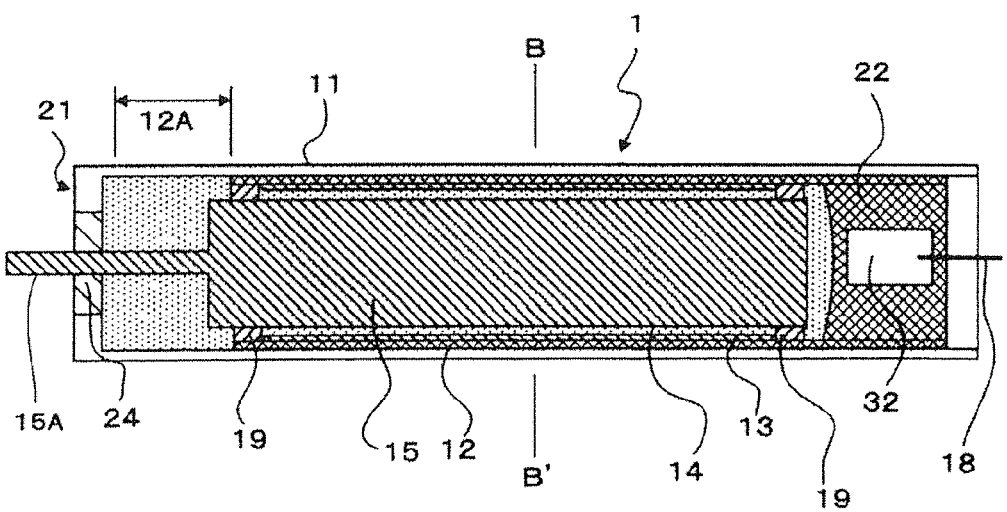
Figure 4B:
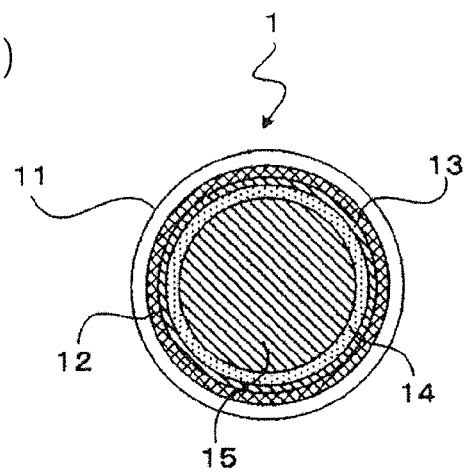
Figure 5A:
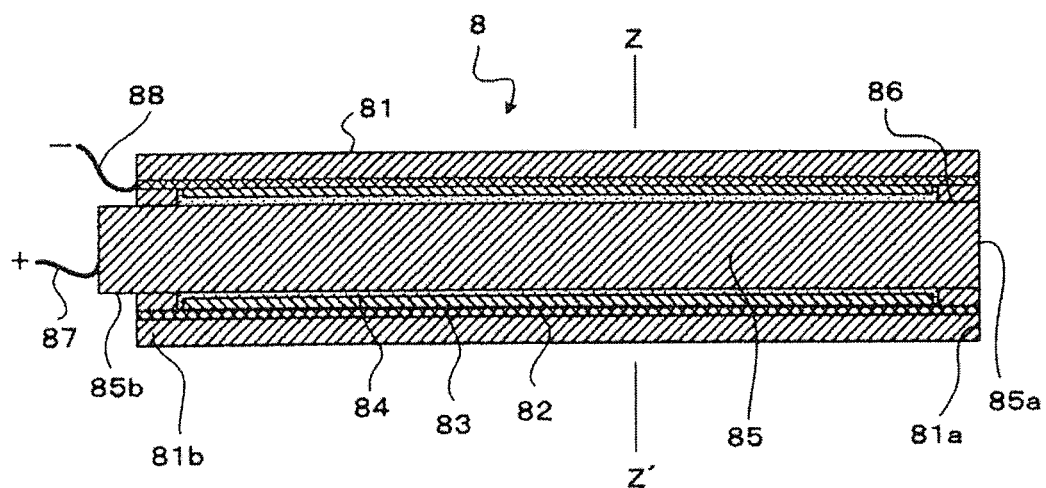
FIG. 5(a) is a cross-sectional view along the direction of the tube axis.
Figure 5B:
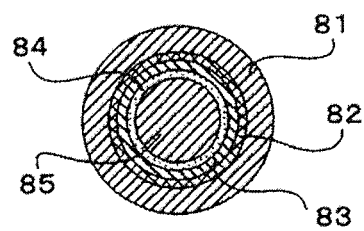
FIG. 5(b) is a cross-sectional view of Z-Z' in FIG. 5(a).

FIG. 4(a) shows a cross-sectional view of the dye-sensitized solar cell according to the other embodiment of the present invention along the direction of the longitudinal tube axis, and FIG. 4(b) shows a cross-sectional view along line B-B' in FIG. 4(a) in the direction of the tube diameter.

In the present embodiment, only the shape of the counter electrode 15, the configuration of the sealing portion 21 at the other end side of the counter electrode 15 with regard to the lead, and the insulator 19 holding the counter electrode 15 differ from the first embodiment shown in FIG. 1. Because the remaining configuration is similar to that of the above-mentioned embodiment, an explanation thereof will be omitted.

A rod-shaped counter electrode 15 is inserted into the interior of the tube-shaped vessel 11 along the tube axis. As was mentioned above, the counter electrode 15 may be implemented by, for example, an object made from a metal rod element such as platinum or an object for which a platinum thin film has been provided on a rod element from glass or a conductive material.

The counter electrode 15 is electrically insulated and held in a state in which it is spaced from the transparent conductive film by means of insulators 19, 19. The insulators 19 in this example are, for example, ring-shaped glass elements which hold the counter electrode 15 with the inner circumferential surface of their opening.

A small diameter lead part 15A extends from the other end (the left end) of the counter electrode 15 to the outside. This small diameter lead part 15A serves to reduce stresses generated by the difference of the coefficients of thermal expansion of the counter electrode 15 and the glass of the glass tube 11A during the cooling process after the formation of the sealing portion as far as possible.

The sealing portion 21 at the other end (the left end) side of the tube-shaped vessel 11 is implemented by forming a buffer glass layer 24 that has been melted and fused to the small diameter lead part 15A of the counter electrode 15 projecting to the outside of the tube-shaped vessel 11 and melting and fusing the glass of the end part of the tube-shaped vessel 11 to this buffer glass layer 24.

The sealing portion 21 of the other end side is formed as follows. First, the counter electrode 15 is inserted into the interior of a glass tube 11a for forming the tube-shaped vessel at which the sealing portion 22 of the one end side has been formed. Then, the buffer glass layer 24 is formed in the circumferential direction at the outer circumference of the portion to be sealed of the small diameter lead part 15A of the counter electrode 15.

Here, the buffer glass is a glass having a coefficient of thermal expansion which is higher than the coefficient of thermal expansion of the glass of the glass tube 11A or the tube-shaped vessel and lower than the coefficient of thermal expansion of the counter electrode 15.

As to the method for forming the buffer glass layer 24, the buffer glass material can be heated and softened and wound in the circumferential direction onto the small diameter lead part 15A of the counter electrode 15, but it is also possible to insert the small diameter lead part 15A of the counter electrode 15 into a ring-shaped buffer glass material and to bond this material to the small diameter lead part 15A by a subsequent heating.

Then, an injection tube (not shown) or the like formed in the uncoated region 12A of the tube-shaped vessel 11 is used and a state of a reduced pressure is established in the interior of the tube-shaped vessel 11 by evacuation.

The end part region where the sealing portion 21 of the glass tube is to be formed is heated and softened. By means of this, the end part region melts and contracts inwards and is sealed to the buffer glass layer 24. Thus, the sealing portion is formed.

Thus, a sealing portion can also be formed by means of inserting the buffer glass layer between the counter electrode and the tube-shaped vessel, evacuating the interior of the vessel to the state of a reduced pressure, and contracting the area having been heated.

As, by means of this configuration, thermal stresses occurring because of the difference of the expansion and shrinkage are diminished because of the presence of the buffer glass layer as an intermediate layer, there is no risk even in case of a rod-shaped counter electrode that breakages such as cracks are generated in the sealing portions during the cooling process after the sealing.

What is claimed is:

1. A dye-sensitized solar cell, comprising:
   a tube-shaped vessel made of transparent glass,
   a transparent conductive film at an inner surface of the tube-shaped vessel,
   a photoelectrode formed of a semiconductor film to which a dye has been adsorbed,
   a counter electrode provided in the tube-shaped vessel at a location spaced from the photoelectrode, and
   an electrolytic solution is enclosed in the tube-shaped vessel,
   wherein opposite ends of said tube-shaped vessel are tightly sealed by the glass of the tube-shaped vessel having been melted and compressed in a direction orthogonal to a longitudinal axis of the tube-shaped vessel so as to have sealing portions made of portions of the glass of which the tube-shaped vessel formed and which have a flat plate-shape extending along the direction of the longitudinal axis of the tube-shaped vessel;
   wherein a first external lead is connected electrically to said transparent conductive film and is led out from a first of the sealing portions to the outside of the tube-shaped vessel; and
   wherein a second external lead is connected electrically to said counter electrode and is led out from a second of the sealing portions to the outside of the tube-shaped vessel,
   wherein the transparent conductive film and the first external lead are connected electrically by means of a metal foil embedded in the first of the sealing portions; and
   wherein an internal lead is electrically connected to the counter electrode and the second external lead in the second of the sealing portions by means of a metal foil that is embedded in the second of the sealing portions.

2. The dye-sensitized solar cell according to claim 1, wherein the electrical connection of the first external lead to said transparent conductive film is in the first of the sealing portions at one end of the tube-shaped vessel;
   wherein the electrical connection of the second external lead to said counter electrode is in the second of the sealing portions at the other end of the tube-shaped vessel; and
   wherein said counter electrode is coupled to and held in the second of the sealing portions via an insulating member and wherein said transparent conductive film extends into the second of the sealing portions.

\* \* \* \* \*